United States Patent
Innes et al.

Patent Number: 6,061,565
Date of Patent: May 9, 2000

[54] MOBILE RADIO SYSTEMS

[75] Inventors: Gordon Dingwall Innes, Dollar; David Bonner, East Kilbride, both of United Kingdom

[73] Assignee: Hewlett-Packard Company, Palo Alto, Calif.

[21] Appl. No.: 08/826,054

[22] Filed: Mar. 28, 1997

[30] Foreign Application Priority Data

Apr. 2, 1996 [EP] European Pat. Off. ............. 96302345

[51] Int. Cl.⁷ .................................................... H04Q 7/20
[52] U.S. Cl. ........................... 455/436; 455/440; 455/456; 455/423
[58] Field of Search ..................................... 455/440, 456, 455/436, 442, 443, 67.1, 277.1, 423, 457, 525, 404, 437; 342/450, 457, 458

[56] References Cited

U.S. PATENT DOCUMENTS

| | | |
|---|---|---|
| 5,128,925 | 7/1992 | Dornstetter et al. . |
| 5,214,789 | 5/1993 | George ..................... 455/440 |
| 5,218,367 | 6/1993 | Sheffer et al. ............ 455/404 |
| 5,267,261 | 11/1993 | Blakeney, II et al. .................. 455/437 |
| 5,327,144 | 7/1994 | Stilp et al. . |
| 5,394,158 | 2/1995 | Chia ....................... 455/440 |
| 5,432,841 | 7/1995 | Rimer ..................... 455/456 |
| 5,483,669 | 1/1996 | Barnett et al. ........... 455/437 |
| 5,499,386 | 3/1996 | Karlsson ................. 455/437 |
| 5,508,708 | 4/1996 | Ghosh et al. ............ 342/457 |
| 5,513,246 | 4/1996 | Jonsson et al. .......... 455/456 |
| 5,542,100 | 7/1996 | Hatakeyama ............ 455/456 |
| 5,546,445 | 8/1996 | Dennison et al. ........ 455/456 |
| 5,550,914 | 8/1996 | Clarke . |
| 5,551,058 | 8/1996 | Hutcheson et al. ...... 455/440 |
| 5,613,205 | 3/1997 | Dufour ................... 455/440 |
| 5,625,876 | 4/1997 | Gilhousen et al. ................... 455/277.1 |
| 5,629,710 | 5/1997 | Sawada .................. 342/457 |
| 5,657,487 | 8/1997 | Doner ..................... 455/456 |
| 5,666,662 | 9/1997 | Shibuya .................. 455/456 |
| 5,732,354 | 3/1998 | MacDonald ............. 455/456 |
| 5,844,522 | 12/1998 | Sheffer et al. ........... 455/456 |

FOREIGN PATENT DOCUMENTS

| | | |
|---|---|---|
| 0 241 565 | 10/1987 | European Pat. Off. . |
| 0 398 773 | 11/1990 | European Pat. Off. . |
| 2 260 050 | 3/1993 | United Kingdom . |
| 92/05672 | 4/1992 | WIPO . |
| 93/19560 | 9/1993 | WIPO . |
| 94/27161 | 11/1994 | WIPO . |
| 96/04155 | 2/1996 | WIPO . |
| 97/27711 | 7/1997 | WIPO . |

OTHER PUBLICATIONS

Mobile Station Locating in GSM, by M. Silventoinen & T. Rantalainen, Proc. of 1995 Wireless Communication System Symposium, Long Island, NY, 28–8 Nov. 1995, pp. 53–59.

Anytime, anywhere . . . Big Brother is watching you, by M. Silventoinen & T. Rantalainen, Mobile Europe, Sep. 1995, pp. 43–50.

*Primary Examiner*—Dwayne D. Bost
*Assistant Examiner*—Quochien B. Vuong
*Attorney, Agent, or Firm*—Ladas & Parry

[57] ABSTRACT

In order to locate the position of a mobile station of a mobile radio system, the distance of the mobile station from a base transceiver station is determined, or the distances of the mobile station from at least two base transceiver stations are determined and the position is found by triangulation. In a GSM-type system, there is a predetermined known response delay between a particular signal received by the mobile station from the base transceiver station and a particular response transmitted from the mobile station to the base transceiver station; the distances can therefore be determined from the response delay and a measured period between transmission of the particular signal and reception of the particular response. In a GSM-type system, the mobile station transmits messages indicating the signal strengths of the base transceiver stations it is receiving, and on that basis the system allocates one of the base transceiver stations to the mobile station; in order to measure the distance between the mobile station and at least one other base transceiver station, the messages are modified in order to force a handover from one base transceiver station to another. In a CDMA-type system, the "soft hand-off" feature can be used to determine the distance to two or more BTSs at the same time.

6 Claims, 5 Drawing Sheets

MOBILE RADIO SYSTEMS

TECHNICAL FIELD

This invention relates to mobile radio systems and to methods and apparatus to enable improvements to be made to such systems, or to enable added benefits to be obtained from, or new services to be provided by, such systems.

BACKGROUND ART

As is well known in the art, mobile radio systems, such as cellular telephone systems, employ a number of geographically-spread base transceiver stations with which mobile stations, such as cellular telephones, can communicate by radio. Typically, while a mobile station is switched on, the system keeps track of the area in which the mobile station is situated, that is, that one of the base transceiver stations with which the mobile station is best able to communicate.

This invention was originally conceived to solve the problem of identifying geographical areas where communication between the fixed part of the system and mobile stations, or particular makes or models of mobile stations, is weak, for example where drop-out is a problem, so that the system may be modified, for example by the relocation or addition of base transceiver stations, so that the service provided by the system can be improved. However, it will be apparent from the following description that the invention has other uses.

DISCLOSURE OF INVENTION

In accordance with a first aspect of the present invention, there is provided a position locating method, comprising the steps of: measuring a first property of a first communications link between a first base transceiver station of a mobile radio system and a mobile transceiver station of that system; calculating the distance between the first base station and the mobile station using the first measured property; measuring a second property of a second communications link between a second base transceiver station of the mobile radio system and the mobile transceiver station; calculating the distance between the second base station and the mobile station using the second measured property; and calculating the position of the mobile station using the first and second calculated distances and known positions of the first and second base stations; wherein the system includes facilities for performing an automated handover process between the base stations in dependence upon operating conditions unrelated to the position locating method, and these conditions are modified so as to induce occurrence of a handover which would not otherwise occur; and the property measuring steps are performed generally immediately before, at the time of, or immediately after such an induced handover. Thus, position location can be carried out at any desired time when the mobile station is within range of at least two base stations.

In one embodiment, messages regarding the strength or quality of signal between the mobile station and each base station are monitored, and such messages are selectably modified to indicate a better and/or worse strength or quality of the signal, to induce occurrence of a handover. In a GSM-type system, this may be accomplished by a device inserted in the Abis interface so as to enable the position location method to be performed, without requiring any other modification to the GSM-type system. Reference in this connection is directed to U.S. Pat. No. 5,550,914.

The method may include the further steps of: measuring at least one further property of at least one further communications link between at least one further base transceiver station of the mobile radio system and the mobile station; calculating the distance between the or each further base station and the mobile station using the or each further measured property; and using the or each further distance in the position calculating step.

Preferably, each property which is measured is dependent on temporal transmission delay of a radio signal between the mobile station and the respective base station. However, it may be possible that another property such as signal strength can be measured so as to enable the distance between the base station and mobile station to be calculated sufficiently accurately.

It will be appreciated that once the position of the mobile station has been determined, it may be plotted on a map. Furthermore, the position location method may be repeated so that the track (if any) of the mobile station can be ascertained, and the track may be plotted on a or the map. Additionally the speed and/or direction of travel (if any) of the mobile station may then be determined.

As mentioned above, the invention was originally conceived for use in geographical surveying of the signal strength of the mobile radio system. However, the invention may have other uses, such as: locating the position of a caller who is making an emergency 999 call, for example as a result of a road accident when they are not sure of their exact position; tracking and locating stolen mobile telephones or stolen vehicles; vehicle fleet management; and generally as a service to tell users where they are.

BRIEF DESCRIPTION OF DRAWINGS

Specific embodiments of the present invention will now be described by way of nonlimiting example with reference to the accompanying drawings in which.

BEST MODE FOR CARRYING OUT THE INVENTION, & INDUSTRIAL APPLICABILITY

Figure 1:
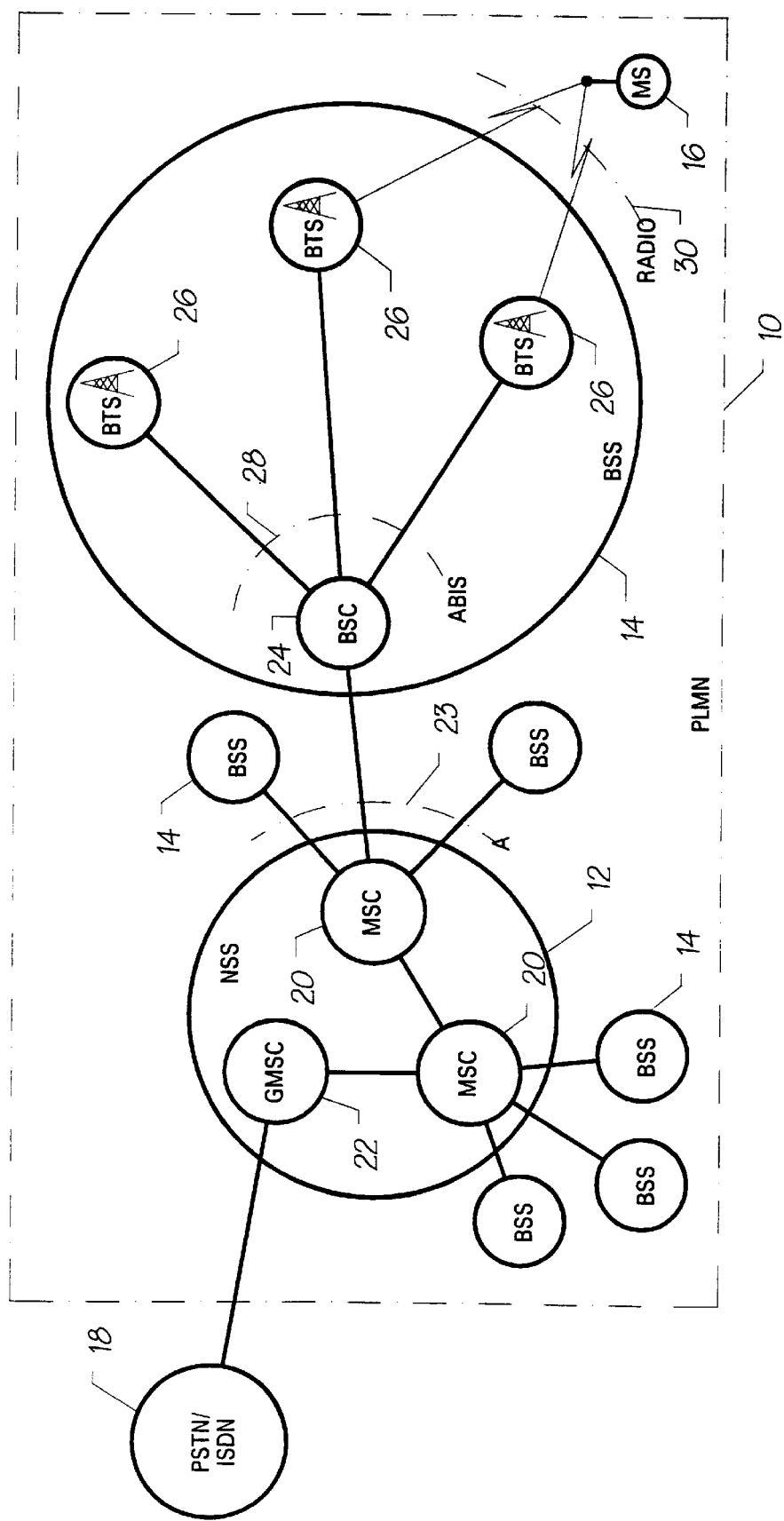
FIG. 1 is a block diagram of the main components of a known GSM cellular mobile radio system.

Referring to FIG. 1, a GSM public land mobile network ("PLMN") 10 comprises a network and switching subsystem ("NSS") 12, which connects with a plurality of base station subsystems ("BSSs") 14. The BSSs 14 provide radio communication with mobile stations ("MSs") 16, only one of which is shown in FIG. 1. The NSS 12 also communicates with the fixed public network 18, i.e. the public switched telephone network ("PSTN") and the integrated services digital network ("ISDN"). Therefore, calls can be wholly contained within the PLMN 10, or can be passed either way between the PLMN 10 and the PSTN/ISDN 18.

The NSS 12 includes mobile switching centres ("MSCs") 20 which are interconnected by dedicated connections or via the PLMN 10, and at least some of the MSCs 20 are gateway mobile switching centres ("GMSCs") 22, which handle calls directed to MSs 16 from outside of the PLMN 10, the GMSC 22 determining where the call should be routed to connect to the required MS 16. Each MSC 20 may be connected to one or more of the BSSs 14, and the interface between a BSS 14 and its MSC 20 is standardised and referred to in GSM parlance as the "A" interface 23.

Each BSS 14 includes a base station controller ("BSC") 24 connected via the A interface 23 to the MSC 20 and controls a plurality of base transceiver stations ("BTSs") 26, the interface between the BSC 24 and its BTSs 26 being known in GSM parlance as the "Abis" interface 28. A plurality of BTSs 26 may be collocated at each site. Each BTS 26 has radio transmitters and receivers for providing radio coverage of a local area known as a "cell" so that communication can be established with MSs 16 across the radio interface 30.

In operation, each BTS 26 periodically transmits its identity. When an MS 16 is switched on, it listens to the identity or identities transmitted by the BTS or BTSs 26 of which it is within range and measures the received signal strength(s). When a connection is present between the MS 16 and a BTS 26, the MS 16 then periodically transmits messages indicating the received signal strength(s) of the BTS(s) 26. As a result, the PLMN 10 can choose which BTS 26 is best suited for communication with the MS 16. This information is kept up to date, and as the MS 16 moves the system can "handover" a MS 16 from one BTS 26 to another.

Figure 2:
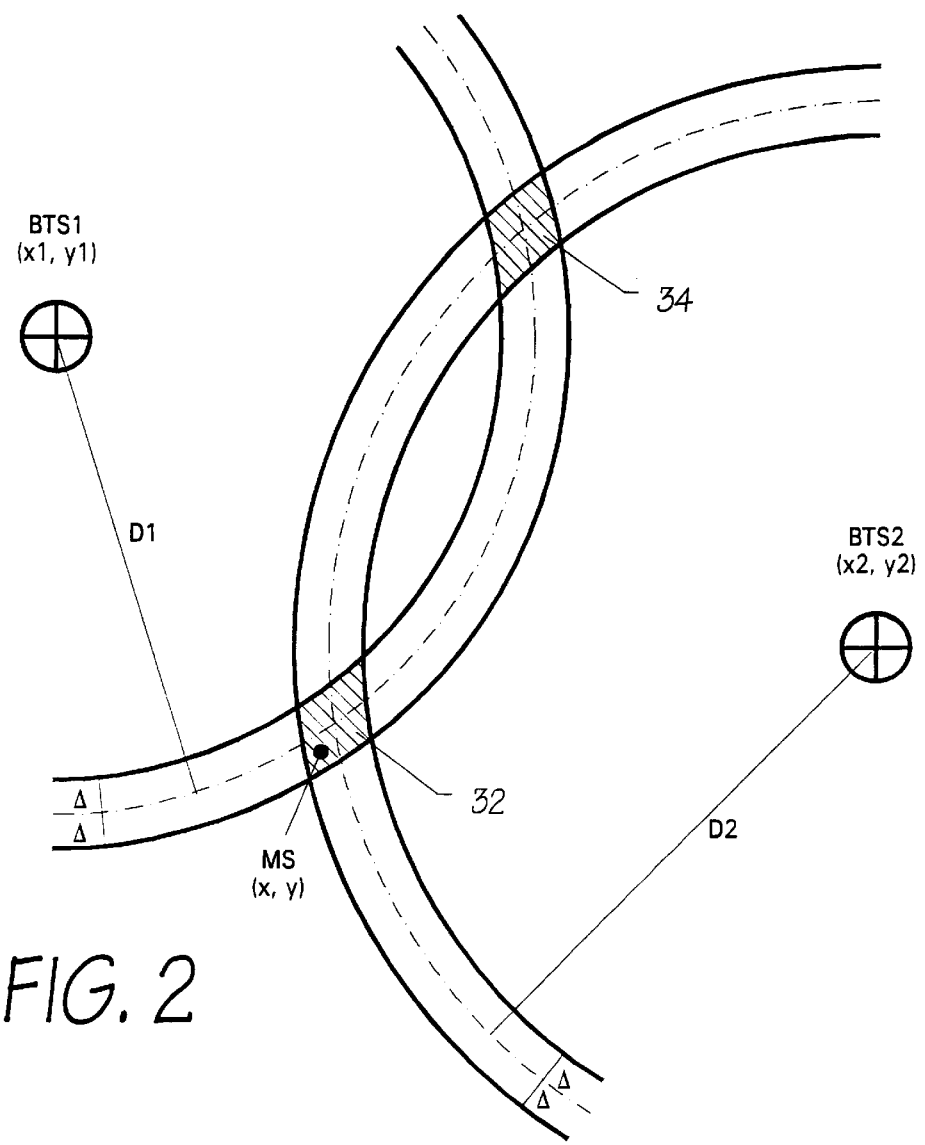
FIG. 2 is a diagram showing how the position of a mobile station can be estimated from the signal delays between the mobile station and two base transceiver stations.

In accordance with an embodiment of the invention, in order to locate the position of a MS 16, the distance of the MS 16 from its BTS 26 is determined just before a handover, and just after a handover the distance of the MS 16 from its new BTS 26 is also measured. On the assumption that the distance moved by the MS 16 between the two distance measurements being taken is insignificant, the MS 16 can be determined by triangulation to be at one of two places, or in one of two areas taking into account inaccuracies in the distance measurements. Referring to FIG. 2, a mobile station MS is associated with a base transceiver station BTS1 located at a position (x1, y1), and the measured distance from the MS to BTS1 is D1±Δ immediately before a handover to a neighbouring base transceiver station BTS2 located at a position (x2, y2). Immediately after the handover, the measured distance from MS to BTS2 is D2+Δ. Given that the alues x1, y1, x2, y2, D1, D2 and Δ are all known, it is determined from triangulation hat the position (x, y) of the MS lies within one of the two hatched areas 32, 34.

Figure 3:
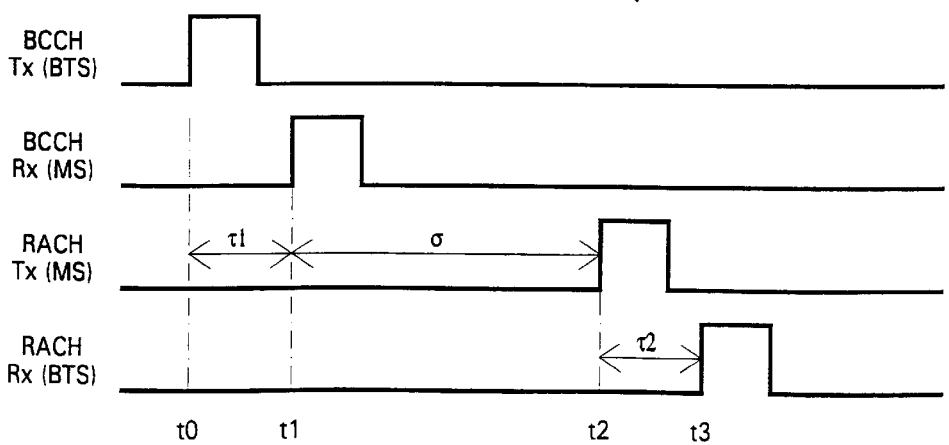
FIG. 3 is a timing diagram to illustrate how the signal delay can be determined.

In accordance with an embodiment of the invention, the distance between a BTS 26 and MS 16 is determined from signal delays as follows. In a GSM system, as well as other TDMA and CDMA systems, the transmission signals are separated into discrete bursts. Referring to FIG. 3, each BTS 26 generates a broadcast channel signal "BCCH". The BTS 26 can register an absolute time reference t0 of the beginning of each burst which it transmits. The MS 16 receives the burst at a time t1, which is delayed from time t0 by a period τ1. This burst is the last received burst prior to the MS 16 transmitting an access channel request on a random access channel RACH. The embodiment of the invention takes advantage of the fact that, in a GSM system, when the MS 16 first communicates to the BTS 26, it generates its access channel request on the RACH at a time t2 which is synchronised to the reception of the BCCH burst with a known fixed delay of period σ, which in a GSM system is three time slots, i.e. σ=3×576.92 $\mu$s=1.73076 ms. The access channel request on the RACH is received by the BTS 26 at time t3, which is delayed from time t2 by a period τ2, and the BTS 26 registers the absolute time t3. On the assumption that the distance which may be travelled by the MS 16 during the period σ is small, then the two delays τ1, τ2 will be equal, and the BTS 26 can calculate the distance D to the MS 16 from the formula D=½ c.(t3−t0−σ), where c is the speed of light.

In a GSM system, an alternative method of determining the distance of the MS 16 from the BTS 26 is to monitor a "timing advance" field in a "measurement result" message passed on the Abis interface 28. In a GSM system, the timing advance field can contain values from 0 to 63. The timing advance field is measured in terms of bit periods, with each bit period equating to 3.692 $\mu$s. This results in timing advance bands equating to bands of ½ c×3.692 $\mu$s≈554 m so that for a given timing advance value, the distance from the BTS is:

| Timing Advance | Distance from BTS |
|---|---|
| 0 | 0 to 554 m |
| 1 | 554 to 1108 m |
| 2 | 1108 to 1662 m |
| . | . |
| . | . |
| . | . |
| 63 | 34902 to 35456 m |

Figure 4:
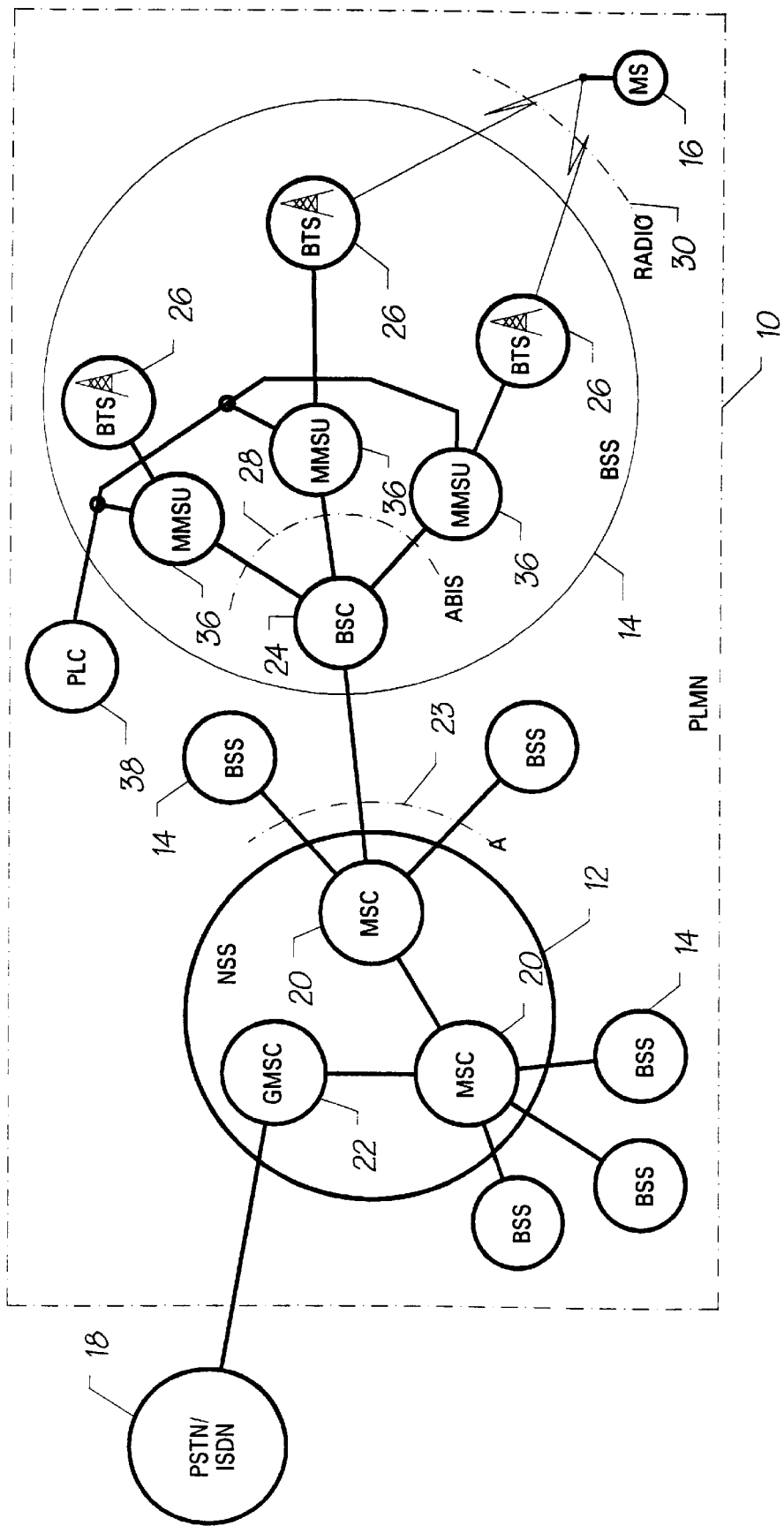
FIG. 4 is a block diagram similar to FIG. 1, but showing how the system is modified in accordance with an embodiment of the invention.
Figure 5:
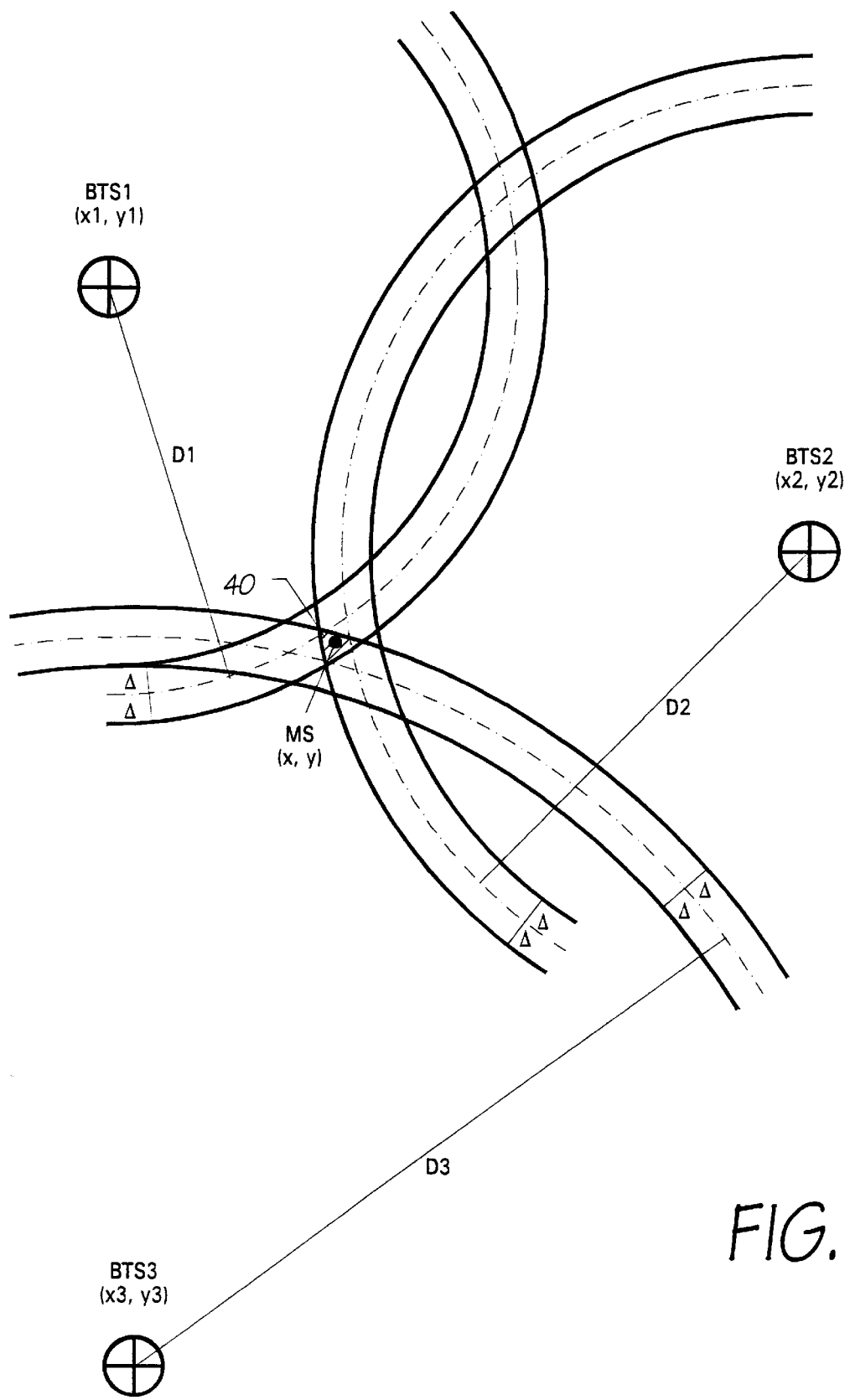
FIG. 5 is a diagram showing how the position of a mobile station can be estimated from the signal delays between the mobile station and three base transceiver stations.

The embodiment of the invention described above is operable to determine distances and locations at the time of a handover, and as described so far relies on handovers arising in the normal operation of the system. There now follows a description of a development whereby distances and locations can be determined on demand. FIG. 4 of the drawings shows a modification of the system of FIG. 1 in which a message monitoring and substitution unit ("MMSU") 36 is placed in the Abis interface 28 between each BTS 26 and its BSC 24, and the MMSUs 36 are controlled by a position location controller ("PLC") 38. The PLC 38 and MMSU 36 may be integrated with, or separate from, the BTS 26 and the BSC 24 components of the PLMN 10. The PLC 38 can control the MMSUs 36 so that they have no effect on the system, which therefore operates in the normal conventional manner. However, the PLC 38 can also control the MMSUs 36 so that they monitor the signal strength messages passed by a particular MS 16, or a particular type of MS 16 (for example a particular make and model) or all MSs, via selected BTSs 26 to the system, and so that they can modify those messages so as to force a handover of the MS 16 from one BTS 26 to another on demand. The MMSUs 36 also collect the distance information from the BTSs 26 and supply it to the PLC 38 where it is processed in order to determine the location of each mobile station under analysis. Referring to FIG. 5, suppose that the MS is transmitting messages that the signal strengths from BTS1, BTS2 and BTS3 are 10, 7 and 6, respectively, and that the MS is accordingly associated with BTS1. A distance measurement is carried out as described above with reference to FIG. 3 to determine the distance D1 from the MS to BTS1. The MMSU for BTS1 then modifies the signal strength message from the MS, for example to specify that the signal strengths from BTS1, BTS2 and BTS3 are 0, 7 and 0, respectively, before the message is passed on to the BSC 24. As a result the system forces a handover from BTS1 to BTS2. A distance measurement is then carried out as described above with reference to FIG. 3 to determine the distance D2 from the MS to BTS2. The MMSU for BTS2 then modifies the signal strength message from the MS, for example to specify that the signal strengths from BTS1, BTS2 and BTS3 are 0, 0 and 6, respectively, before the message is passed on to the BSC 24. As a result the system forces a handover from BTS2 to BTS3. A distance measurement is then carried out as described above with reference to FIG. 3 to determine the distance D3 from the MS to BTS3. The MMSU for BTS3 then ceases to modify the signal strength messages, as a result of which, and assuming the measured signal strengths have not changed, the system may perform a routine handover from BTS3 (signal strength 6) to BTS1 (signal strength 10). As shown in FIG. 5, having determined the distances D1 to D3 of the MS from BTS1 to BTS3, and knowing the locations of BTS1 to BTS3, the PLC 38 can then determine by triangulation the position of the MS as being within the hatched area 40. It will be appreciated that by using three or more BTSs, the ambiguity as to location area, as illustrated by the two hatched areas 32, 34 in FIG. 2, is resolved, and also that the determined area is likely to be smaller.

As described above the distances of the MS 16 from a plurality of BTSs 26 may be determined at the time of a routine handover arising as a result of the signal strengths received by the MS 16 from the BTSs 26, or at the time of a forced handover caused specifically for the purpose of calculating more than one distance. The distances may also be determined at times of other sorts of handover. For example, in GSM systems, it is known to have macro cells for which the BTSs 26 have a long range, for example due to the antennae being above roof level, and to have micro cells for which the BTSs 26 generally have a shorter range, for example due to the antennae being below roof level, and it is known to hand over a particular MS 16 from a micro cell to a macro cell covering the same area if that MS is adjudged to have a high speed of movement, so that subsequent handovers need not be so frequent, and conversely to hand over a particular MS 16 from the macro cell to a micro cell covering the same area if that MS is adjudged to have slowed down, so as to free up the capacity of the macro cell. The position of the MS 16 may therefore be calculated at the time of a handover from a macro cell to a micro cell, or vice versa. It is also possible that a handover could be forced between macro and micro cells for the purpose of position location, even though the speed of the MS 16 would not normally dictate such a handover. As another example, it is known to provide "graceful" shutdown of BTSs 26 when they are being taken out of action, by handing over the MSs 16 for which that BTS is responsible to one or more other BTSs. Position location of the MSs 16 may be performed at that time.

The methods used to perform the other types of handover can also be applied for the purpose of forcing handover to enable location to be determined.

An embodiment of the invention has been described above with reference to a GSM system, but it should be noted that the invention is also applicable to other type of cellular mobile radio system, including CDMA and TDMA. In the arrangement described with reference to FIG. 2, the location of the MS is determined at the time of a routine handover, and in FIG. 5 at the time of a forced handover in the case of a GSM system. As an alternative, the CDMA system employs "soft hand-off", in which, when transferring from a first BTS to a second, a link is established between the MS and the second BTS (and possibly a third BTS) before the link with the first BTS is broken. Position location can therefore advantageously take place when the MS is in communication with two or more BTSs at the time of such a soft hand-off. As another alternative, in a system in which MSs monitor multiple BTSs listening for call establishment messages, the invention may be applied by causing a plurality of calls to be initiated from a plurality BTSs to a particular MS. Each call would be established only long enough to determine the distance information, and then ended. More generally, the distance(s) of an MS 16 from any one or more BTSs 26 which can communicate with that MS 16 may be determined by establishing a link between the MS 16 and the or each BTS 26 solely for the purpose of determining the distance, and the link may be established at the request of the MS 16, the user of the MS 16, or the PLMN 10.

Figure 6:
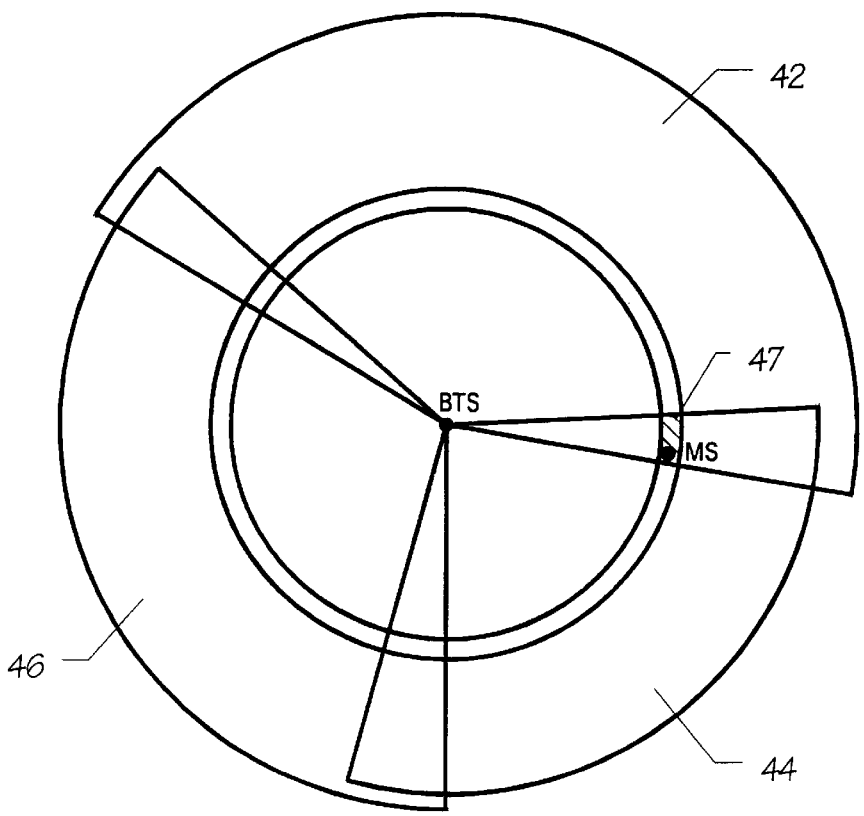
FIG. 6 is a diagram showing how the position of a mobile station can be estimated from the signal delay between the mobile station and a sectored base transceiver station.

It will be appreciated that many other modifications and developments may be made to the invention. For example, FIG. 6 illustrates how the present invention may be applied in the case of a BTS having three co-sited sectored transceivers with coverage areas 42, 44, 46 which overlap. With such a BTS, handovers can occur as a MS moves from one sector to the next through an area of overlap. By measuring the distance between the BTS and the MS in the manner described above with reference to FIG. 3 immediately before and/or immediately after a handover, it will be appreciated that it is possible to determine an area 47 in which the MS is situated at that time from the measured distance and the particular area of overlap.

Figure 7:
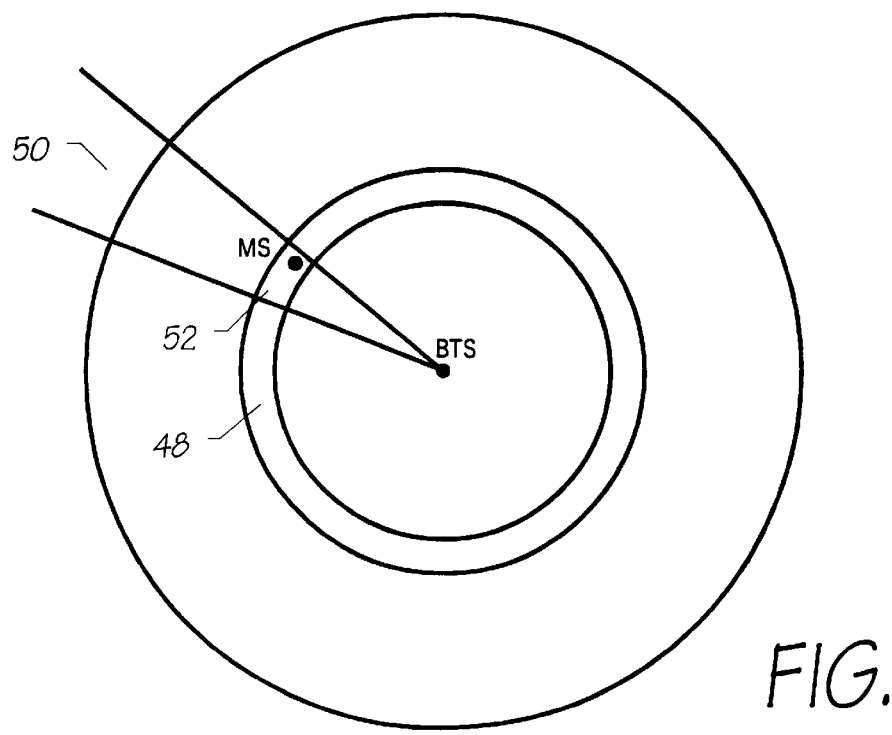
FIG. 7 is a diagram showing how the position of a mobile station can be estimated from the signal delay between the mobile station and a base transceiver station having a "smart antenna" technology.

FIG. 7 illustrates how the present invention may be applied in the case of a BTS which may employ "smart antenna" technology. With that technology, a BTS is able to determine, within limits, the bearing 50 of the MS with respect to the BTS. By also determining the distance 48 of the MS from the BTS in the manner described above with reference to FIG. 3, it is possible to determine an area 52 in which the mobile station is situated.

In the detailed description set out above, handover is forced by modifying signal strength messages passed around the system. Alternatively, messages relating to other parameters such as signal quality may be modified in order to force a handover. Furthermore, in a system in which mobile stations can issue messages requesting handover, additional messages requesting handover may be generated, for example by units somewhat like the MMSUs 36 in FIG. 4, in order to force a handover.

We claim:

1. A position locating method for a mobile radio system having, facilities for performing an automated handover process between base stations in dependence upon indications of operating conditions unrelated to position locating, the position locating method comprising the steps of:

measuring a first property of a first communications link between a first base transceiver station of the mobile radio system and a mobile transceiver station of that system;

calculating a distance between the first base station and the mobile station using the first measured property;

modifying the indications of operating conditions to be inconsistent with actual operating conditions, so as to induce occurrence of a handover which would not otherwise occur and thereby cause the mobile transceiver to communicate with at least a second base transceiver station of the mobile radio system;

measuring a second property of a second communications link between the second base transceiver station and the mobile transceiver station;

calculating a distance between the second base station and the mobile station using the second measured property;

performing the property measuring steps generally immediately before, at the time of, or immediately after the induced handover; and calculating a position of the mobile station using the first and second calculated distances and known positions of the first and second base stations.

2. A method as claimed in claim 1, wherein messages regarding the strength or quality of signal between the mobile station and each base station are monitored, and such messages are selectably modified to indicate a better and/or worse strength or quality of the signal, to induce occurrence of a handover.

3. A method as claimed in claim 1, including the further steps of:

measuring at least one further property of at least one further communications link between at least one further base transceiver station of the mobile radio system and the mobile station;

calculating the distance between the or each further base station and the mobile station using the or each further measured property; and using the or each further distance in the position calculating step.

4. A method as claimed in claim 1, wherein each property which is measured is dependent on temporal transmission delay of a radio signal between the mobile station and the respective base station.

5. A method as claimed in claim 4, wherein there is a predetermined known response delay between a particular signal received by the mobile station from the base transceiver station and a particular response transmitted from the mobile station to the base transceiver station, the transmission delay being determined from the response delay and a measured period between transmission of the particular signal and reception of the particular response.

6. A method as claimed in claim 1, wherein the base station is generally co-sited with another base station, the base stations performing sectored operation with overlap between the sectors and automatic handover between the base stations, and the measuring steps being initiated when the mobile station is situated in the overlap of the sectors of the base stations; and the position of the mobile station is calculated using the calculated distance and a known sector of overlap of the base stations.

* * * * *